US010817141B2

(12) United States Patent
Salter et al.

(10) Patent No.: US 10,817,141 B2
(45) Date of Patent: Oct. 27, 2020

(54) VEHICLE INPUT DEVICE HAVING OFFSET REGISTRATION

(71) Applicant: Ford Global Technologies, LLC, Dearborn, MI (US)

(72) Inventors: Stuart C. Salter, White Lake, MI (US); Pietro Buttolo, Dearborn Heights, MI (US); Kristopher Brown, Dearborn, MI (US); David Brian Glickman, Southfield, MI (US); Cornel Lewis Gardner, Romulus, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/252,782

(22) Filed: Jan. 21, 2019

(65) Prior Publication Data

US 2020/0233540 A1 Jul. 23, 2020

(51) Int. Cl.
*G06F 3/0482* (2013.01)
*G06F 3/0488* (2013.01)

(52) U.S. Cl.
CPC ........ *G06F 3/0482* (2013.01); *G06F 3/04883* (2013.01)

(58) Field of Classification Search
CPC ......... H04W 4/80; G06F 3/044; G06F 3/0482
See application file for complete search history.

(56) References Cited

U.S. PATENT DOCUMENTS

| 10,435,924 B1* | 10/2019 | Salter ............... B60R 25/243 |
| 2008/0007434 A1 | 1/2008 | Hristov |
| 2013/0176275 A1 | 7/2013 | Weaver et al. |
| 2013/0201155 A1 | 8/2013 | Wu et al. |
| 2017/0101076 A1* | 4/2017 | Krishnan ............... H04W 4/80 |
| 2019/0351872 A1* | 11/2019 | Phillips ............... G06F 1/163 |

* cited by examiner

*Primary Examiner* — Cao H Nguyen
(74) *Attorney, Agent, or Firm* — David Coppiellie; Price Heneveld LLP

(57) ABSTRACT

A vehicle keypad device is provided that includes a touchscreen having an array of proximity sensors located on an exterior of a vehicle, a keypad display displaying virtual input button icons proximate the proximity sensors, and a controller determining a location of a user input from the proximity sensors, determining an offset of the input from one of the virtual input icons and adjusting a sensor area of the proximity sensors for the icon based on the offset.

19 Claims, 16 Drawing Sheets

VEHICLE INPUT DEVICE HAVING OFFSET REGISTRATION

FIELD OF THE INVENTION

The present invention generally relates to vehicle input devices, and more particularly relates to an input device, such as a keypad display for use on a vehicle.

BACKGROUND OF THE INVENTION

Automotive vehicles are commonly equipped with various user input devices for entering user inputs to control devices or functions. For example, keypads are often provided on the vehicle body exterior to enable a user to enter a sequence of inputs as a code to actuate a door lock or unlock function without the need to use a mechanical key or key fob. Conventional keypads employed on motor vehicles typically include mechanical switches actutable by a user. Additionally, display devices are often implemented on the interior of the vehicle. It would be desirable to provide for an enhanced input device that may more readily accommodate varying use conditions.

SUMMARY OF THE INVENTION

According to one aspect of the present invention, a vehicle input device is provided. The vehicle input device includes a touchscreen having an array of proximity sensors located on a vehicle, a display displaying virtual input icons, and a controller determining a location of a user input from the proximity sensors, determining an offset of the input from one of the virtual input icons and adjusting a sensing area of the proximity sensors for the icon based on the offset.

Embodiments of the first aspect of the invention can include any one or a combination of the following features:
 the virtual input icons define keypad inputs for a keypad device;
 the device is located on an exterior of the vehicle to control vehicle access based on user input of the keypad device;
 the device is located on a vehicle pillar;
 each virtual input icon is displayed on an area of the display over a plurality of proximity sensors for sensing user interaction with the icon;
 signals sensed with the plurality of proximity sensors are summed to provide a total signal value that is used to activate a keypad;
 the controller adjusts an offset for each of the virtual input icons based on the offset;
 the proximity sensors comprise capacitive sensors;
 the capacitive sensors are configured in an array;
 the controller stores the offset in memory for a unique user and adjusts the sensor area based on the stored offset for future use by the user; and
 the unique user is identified based on a user identification sensor.

According to another aspect of the present invention, a vehicle keypad device is provided. The vehicle keypad device includes a touchscreen having an array of proximity sensors located on an exterior of a vehicle, a keypad display displaying virtual input button icons proximate the proximity sensors, and a controller determining a location of a user input from the proximity sensors, determining an offset of the input from one of the virtual input icons and adjusting a sensing area of the proximity sensors for the icon based on the offset.

Embodiments of the second aspect of the invention can include any one or a combination of the following features:
 the device is configured to control vehicle access based on user input of the keypad device;
 each virtual input button icon is displayed on an area of the display over a plurality of proximity sensors for sensing user interaction with the virtual button icon;
 the proximity sensors comprise capacitive sensors, wherein the capacitive sensors are configured in an array;
 each virtual input icon is displayed on an area of the display over a plurality of proximity sensors for sensing user interaction with the icon; and
 the controller stores the offset in memory for a unique user and adjusts the sensor area based on the stored offset for future use by the user, wherein the unique user is identified based on user identification.

According to yet another aspect of the present disclosure a method of generating a user input is provided. The method includes the steps of providing a touch screen having an array of proximity sensors located on a vehicle, displaying virtual input button icons proximate to the proximity sensors, sensing a user interacting with the proximity sensors, determining an offset distance between the sensed user interaction and a virtual button icon, and adjusting a sensing area of one or more of the virtual button icons based on the determined offset.

Embodiments of the third aspect of the invention can include any one or a combination of the following feature:
 the virtual input icons define keypad inputs for a keypad device, wherein the device is located on an exterior of the vehicle to control vehicle access based on user input of the keypad device; and
 the controller stores the offset in memory for a unique user and adjusts the sensing area based on the stored offset for future use by the user.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
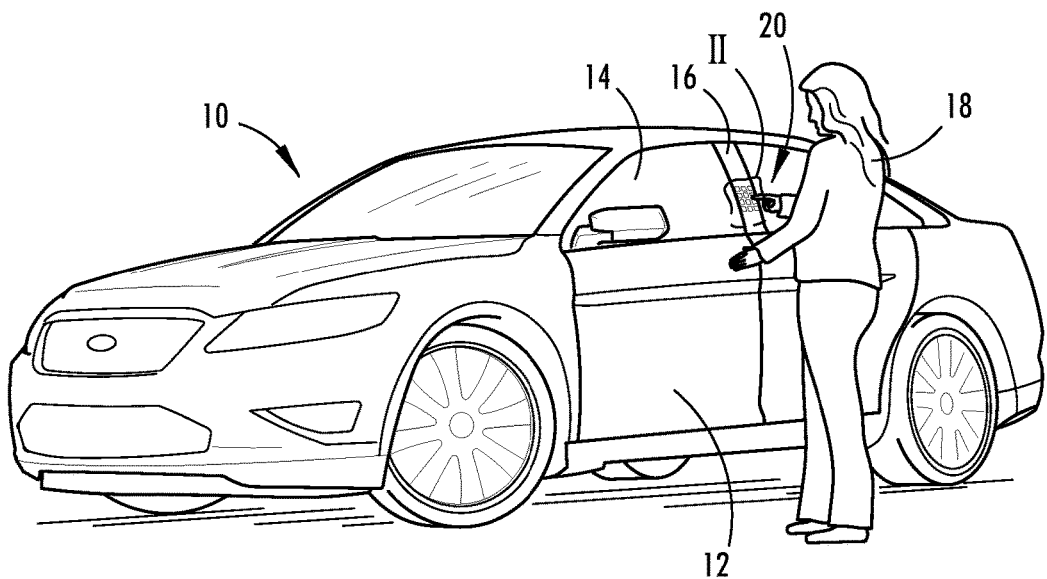
FIG. 1 is a side perspective view of a motor vehicle equipped with a vehicle keypad user input device for inputting keypad inputs on the vehicle, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a wheeled motor vehicle 10 is generally illustrated having a vehicle keypad user input device 20 shown configured as a vehicle door access keypad assembly that enables a person to enter a sequence of inputs such as to lock and unlock the vehicle doors and open and close the one or more doors, according to one embodiment. The vehicle keypad user input device 20 may also be configured as an input and output device to provide a display and user inputs for other applications, according to other embodiments. The vehicle 10 may be a wheeled vehicle that generally includes passenger doors 12 provided on the vehicle body and a door latch lock assembly is typically built into each door to lock and unlock the door and other doors on the vehicle to control access to the vehicle 10. The door latch lock assembly may be an electronic controlled assembly. It should be appreciated that a driver or other user 18, e.g., passenger, may interface with the vehicle keypad user input device 20 to view inputs such as keypads and sequentially input a code as a sequence of inputs from the outside or exterior of the vehicle 10. The vehicle keypad user input device 20 is shown located on a vehicle body support pillar, such as the B-pillar 16 generally located between a forward passenger door and rearward passenger door and facing the exterior on the side of the vehicle 10. It should be appreciated that the vehicle keypad user input device 20 may be located elsewhere on the vehicle 10 such as within the window 14 of a passenger door 12, the windshield, a door trim piece, a mirror assembly or other vehicle body member.

The vehicle keypad user input device 20 advantageously employs a touchscreen located on the exterior of the vehicle 10 and configured for a user located outside the vehicle 10 to interact with the touchscreen to enter user inputs. In addition, the vehicle input device 20 includes a display for displaying virtual input icons that may be overlaid over proximity (e.g., capacitive) sensors in a settable size and at a settable separation distance from one another. Further, the vehicle keypad user input device 20 includes a controller for dynamically adjusting the size of the displayed virtual input icons based on a user touch event. For example, when a user 18 approaches the vehicle 10 and initially interacts with the vehicle keypad input device 20, the amount of sensed interaction of the user's finger may be sensed and the size of the keypads and separation distance between adjacent keypads may be set based on the initial interaction with the user's finger. If the amount of sensed signal due to user interaction is small, the size may be increased, and if a large signal is sensed the size may be decreased, according to one embodiment. In a specific embodiment, the size of the keypads may be increased when sensor activity is detected but no determination on which keypad was contacted can be made.

Figure 2:
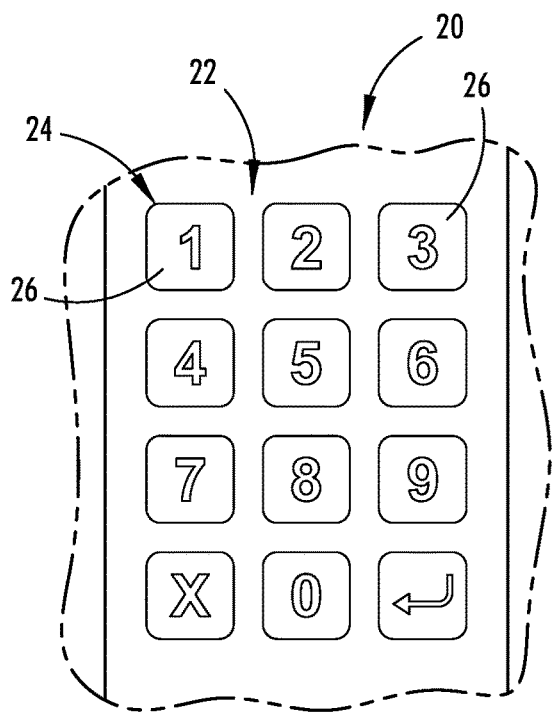
FIG. 2 is an enlarged view of section II of FIG. 1 illustrating the vehicle keypad user input device displaying a first size keypad.
Figure 3:
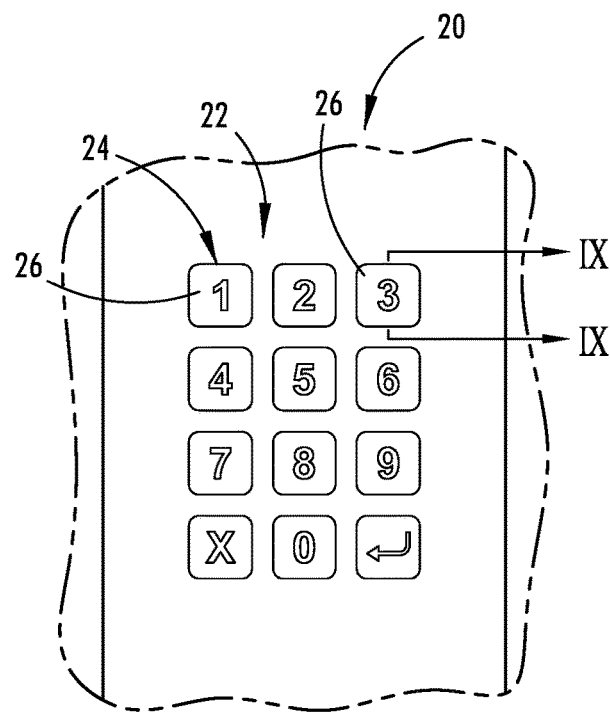
FIG. 3 is an enlarged view of section II of FIG. 1 illustrating the vehicle keypad user input device displaying a reduced second size keypad.

Referring to FIGS. 2 and 3, the size of the vehicle keypad user input device 20 may be varied between an increased first size with a greater separation distance shown in FIG. 2 and a decreased second size with lesser separation in distance shown in FIG. 3. The touchscreen 22 has proximity sensors and the display 24 overlays the proximity sensors to display virtual button icons 26 in the form of selectable input pads having identification characters. The characters are shown including numerical characters 0-9 and other characters for entering a code such as a sequence of character inputs that may be entered by a user to enter a code that is programmed into the controller. The vehicle keypad user input device 20 may present virtual button icons 26 having the large first size and a greater first separation distance between adjacent icons 26 as seen in FIG. 2. This enables the user to more efficiently and effectively interact with the keypad with enhanced signal interaction due to the larger number of sensors associated with each virtual button icon 26. When a lesser capacitive signal is sufficient for use with the finger and/or a more discreet output display is desired, the keypad may be displayed and operate in a reduced second size mode shown in FIG. 3 in which each of the virtual buttons icons 26 has a smaller second size and are located closer together with a lesser second separation distance between adjacent icons 26. This allows for a more compact display of the virtual button icons 26 which may be beneficial when a user is entering a security code that is meant to be hidden from view from other persons.

Figure 4:
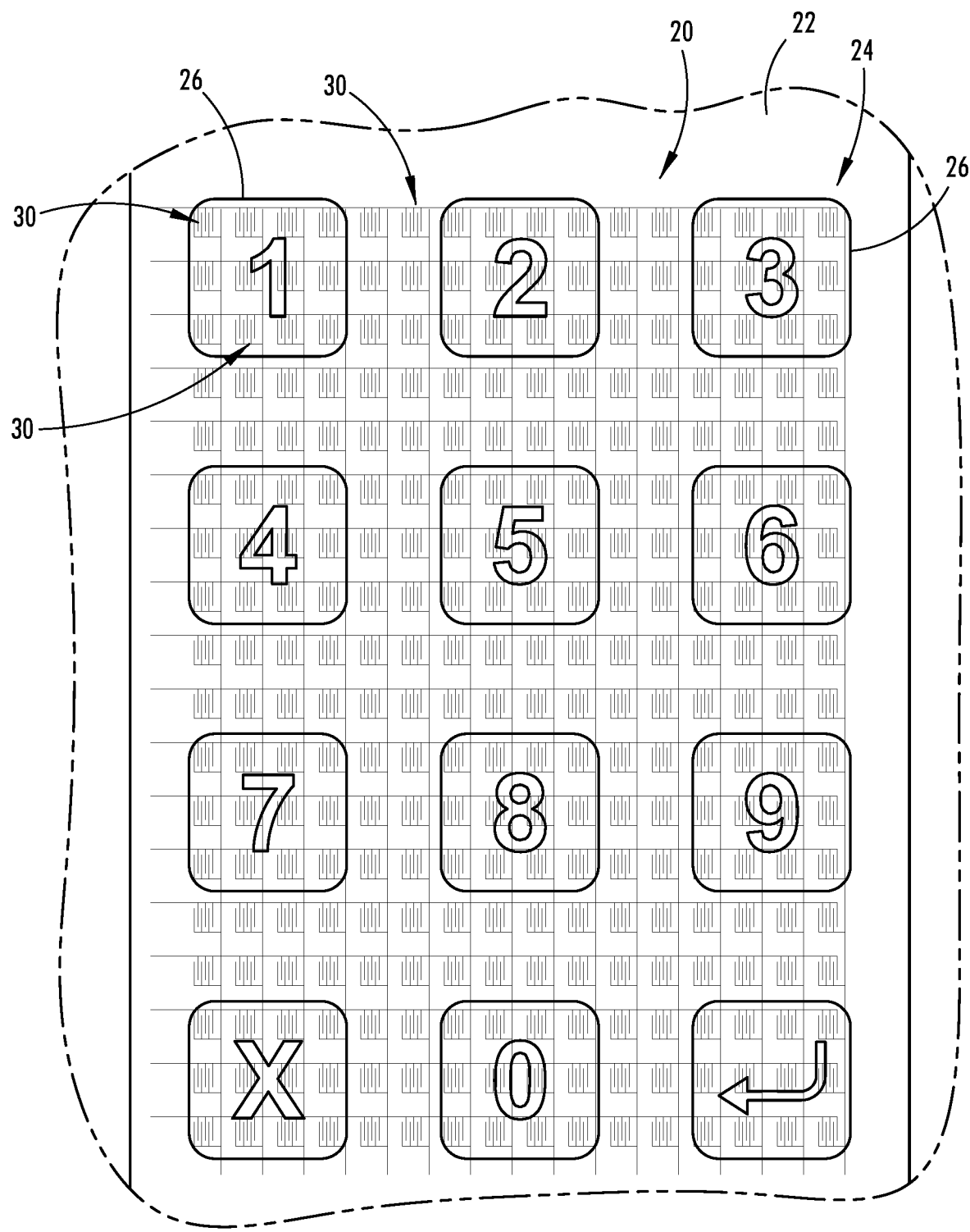
FIG. 4 is a schematic diagram illustrating a capacitive sensor array for use in the vehicle keypad user input device overlayed with the first size enlarged keypads, according to a first embodiment.
Figure 5:
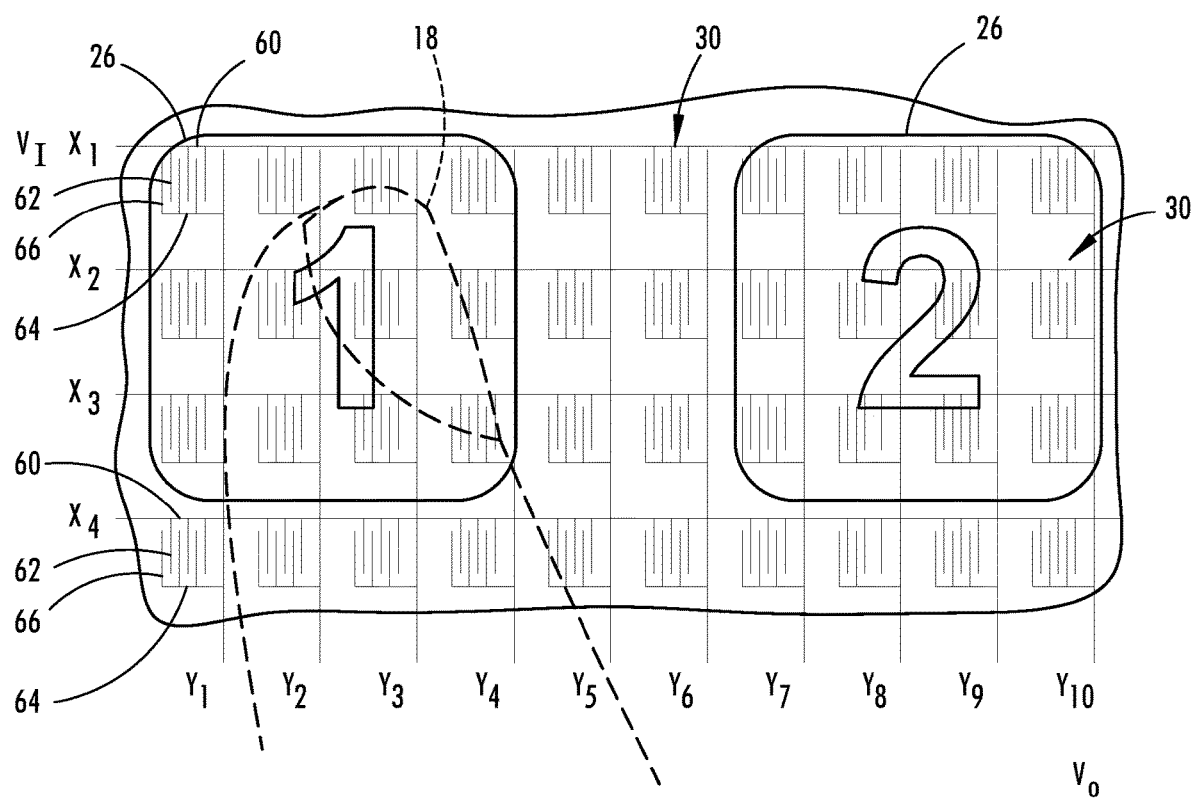
FIG. 5 is an enlarged view of a portion of FIG. 4 further illustrating the enlarged keypads and sensor array and a finger interacting therewith.

Referring to FIGS. 4 and 5, the touchscreen 22 is illustrated having an array of proximity sensors 30 arranged in rows and columns, according to one embodiment. The proximity sensors 30 are shown configured as capacitive sensors having pairs of electrodes, according to a first embodiment. Each of the capacitive sensors 30 includes a first electrode 60 and a second electrode 64. Each of the first and second electrodes 60 and 64 includes respective pluralities of conductive electrode fingers 62 and 66, respectively. As such, the first electrode 60 has a first plurality of electrode fingers 62 and the second electrode 64 has a second plurality of electrode fingers 66. Each of the first and second electrode fingers 62 and 66 are generally positioned to be interdigitated or interlaced with the other of the first and second plurality of electrode fingers 62 and 66 to at least some degree to generate a capacitive activation field for sensing the presence of an object such as a user's hand or finger. Each of the first electrodes 60 may be configured as a receive electrode that receives a sense signal, and each of the second electrodes 64 may be configured as drive electrodes to receive a drive signal. The electrodes 60 and 64 are arranged in an array of rows and columns. The first electrodes 60 are fed signals shown on lines X1-Xn and the second electrodes receive signals Y1-Y10 as seen in FIG. 5. Each capacitive sensor 30 receives an X signal, X1-X4 and generates a corresponding Y signal, Y1-Y10 that generates an activation field and provides an indication as to the capacitance sensed with that capacitive sensor 30.

The capacitive sensors 30 each provide a capacitive sense activation field to sense contact or close proximity (e.g., within one millimeter) of a user, such as a finger, in relation to the corresponding capacitive sensor 30. The capacitive sense activation field of each capacitive sensor 30 detects a user's finger which has electrical conductivity and dielectric properties that cause a change or disturbance in the capacitive sense activation field as should be evident to those skilled in the art. Each of the capacitive sensors 30 provides a sensed signal for the corresponding area proximate to the capacitive sensor 30 which is indicative of a user input for that area. A plurality of capacitive sensors 30 are used together to provide a signal for a virtual button 26 or keypad, and the number of capacitive sensors dedicated to each virtual button 26 varies depending on the size of the virtual button 26.

In the embodiment shown, the capacitive sensors each generally have a drive electrode 60 and a receive electrode 64, each having interdigitated fingers for generating a capacitive field. It should be appreciated that the array of capacitive sensors may be formed by printed conductive ink or by assembling flex conductive circuitry onto a substrate. According to one embodiment, the drive electrode 60 receives square wave drive signal pulses applied at a voltage $V_I$. The receive electrode 64 has an output for generating an output voltage $V_O$. It should be appreciated that the electrodes and electrode fingers may be arranged in various configurations for generating the capacitive fields as the sense activation fields, according to various embodiments. It should further be appreciated that the capacitive sensors may be otherwise configured to each and have dedicated signal lenses coupled to the drive and receive electrodes.

As seen in FIGS. 4 and 5, each virtual button icon 26 has a first size that, in this example, overlays twelve (12) proximity sensors 30. That is, the twelve underlaying proximity sensors 30 are used to sense the signal interacting with the corresponding virtual button icon 26. The virtual button icons 26 arranged in rows and columns are shown separated from the adjacent virtual button icons 26 via two proximity sensors which define a gap therebetween and thus a first separation distance. When a finger of a user 18 interacts with the first size icon 26 as seen in FIG. 5, each of the sensors 30 proximate to the user's finger and overlayed by the virtual button icon 26 generates a signal that may be used to enter an input for the corresponding virtual button icon 26.

Figure 6:
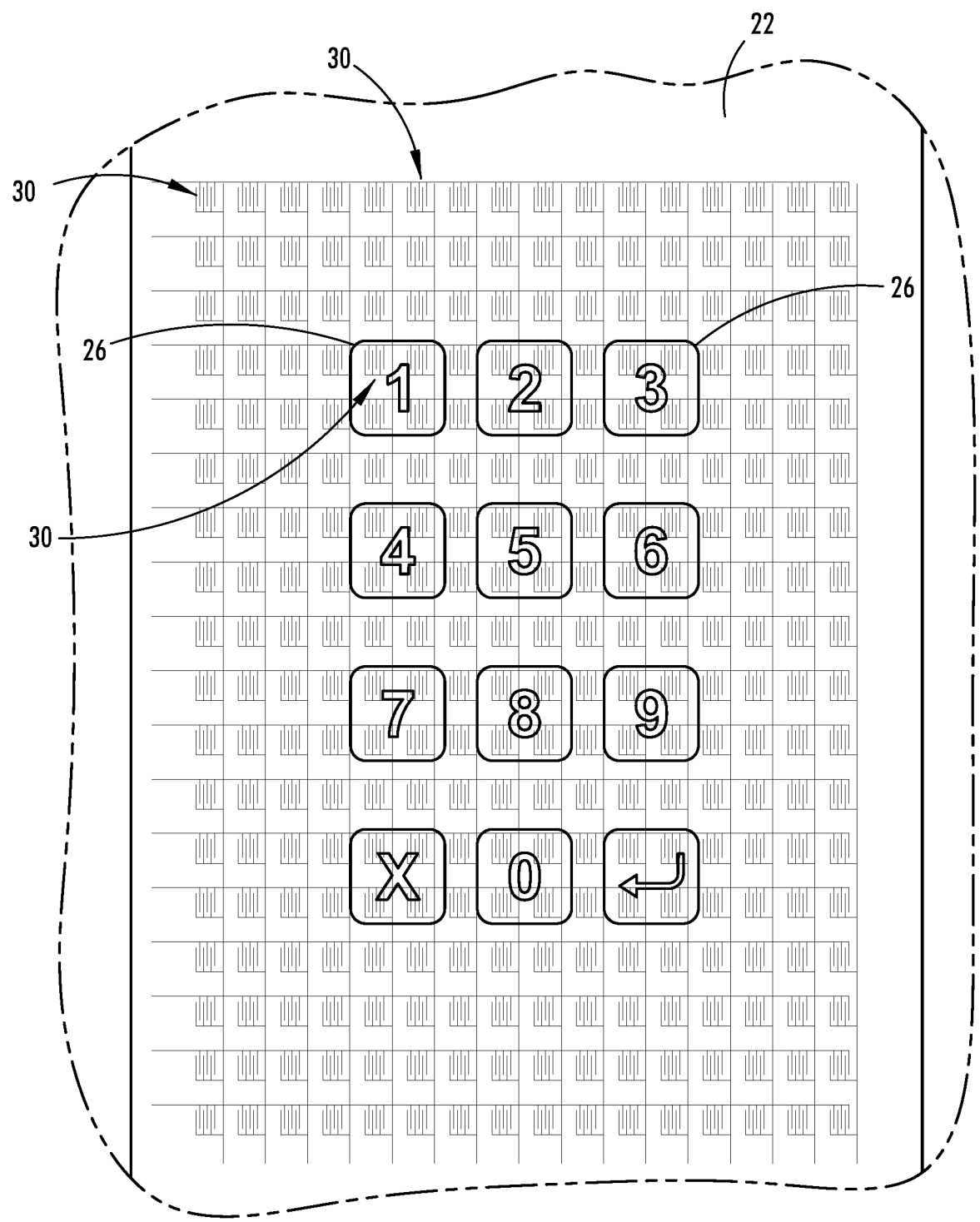
FIG. 6 is a schematic diagram of the vehicle keypad user input device further showing the capacitive sensors and the keypads in the reduced second size.
Figure 7:
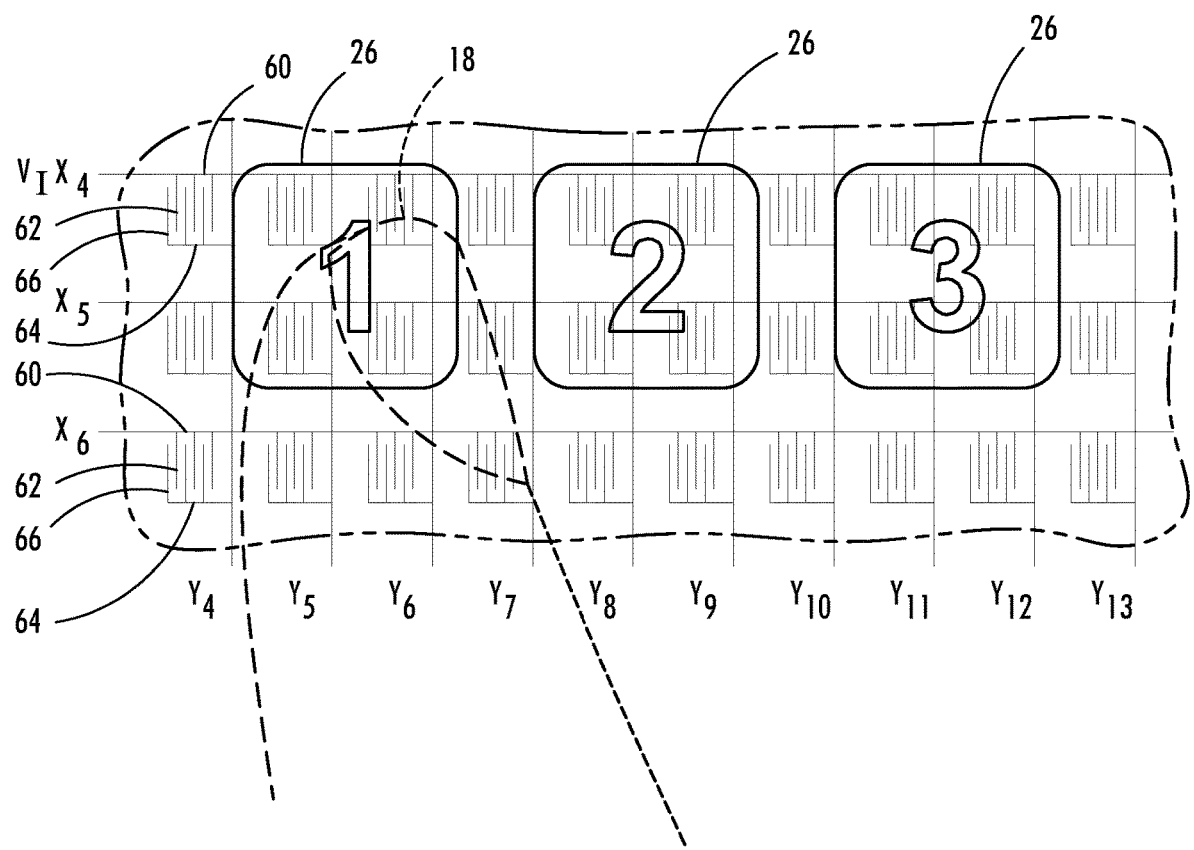
FIG. 7 is a schematic diagram illustrating an enlarged portion of the vehicle keypad user input device of FIG. 6 further illustrating a finger interacting with the sensors.

Referring to FIGS. 6 and 7, the vehicle keypad user input device 20 is shown having virtual button icons 26 of a second size which is less than the first size shown in FIGS. 4 and 5. In this example, the second size of the virtual button icons 26 overlays four (4) proximity sensors 30 and each of the virtual button icons 26 are separated in rows and columns from adjacent icons 26 by a second separation gap or distance of one sensor 30 which is less than the first distance. As such, only four sensors are dedicated to each virtual button icon 26 and are used to identify an input with the corresponding virtual button icon 26. When a user interacts with one of the reduced second size icon 26 as shown in FIG. 7, the four capacitive sensors associated with that icon 26 are used to generate a signal indicative of the interaction therewith. While the virtual button icons 26 are shown centered about the display, it should be appreciated that the virtual button icons 26 may be otherwise located on the display such as in a corner or nearer to one side of the display. It should further be appreciated that other variations in size between the first size and second size may be used and the first and second separation distances may be greater or less for a given application.

Figure 8:
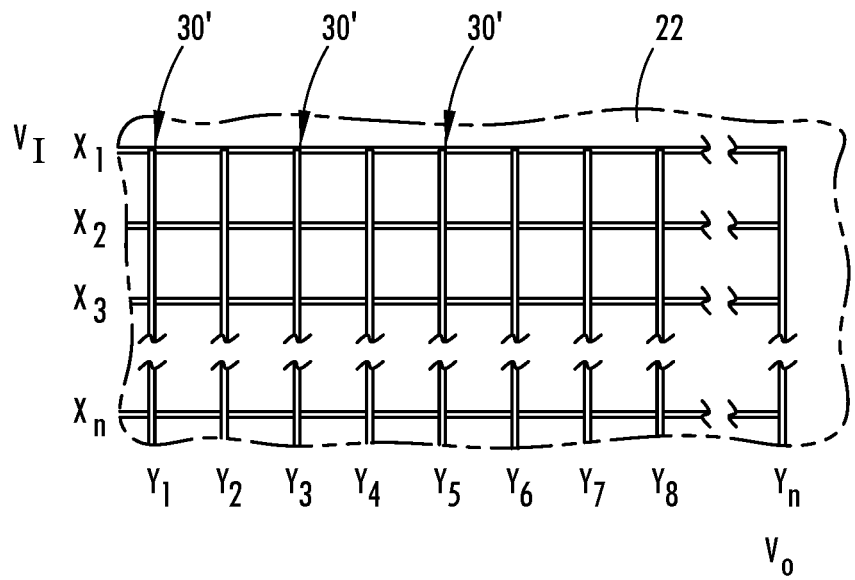
FIG. 8 is a schematic diagram of a capacitive sensor array for use in the vehicle keypad user input device, according to a second embodiment.

Referring to FIG. 8, an array of proximity sensors 30' in the form of single electrode capacitive sensors 30A'-30n' is illustrated in a second embodiment as an alternative to the two electrode capacitive sensor arrangement discussed above. In this embodiment, the touchscreen 22 may include an array of single electrode configured capacitive sensors 30' receiving signals in rows X1-Xn and columns Y1-Yn array. The array of sensors thereby defines rows and columns of single-ended capacitive sensors 30' which may be used to sense user interaction with virtual button icons of varying sizes with the number of sensors 30' and separation distance that varies depending upon the size of the virtual button icons as discussed above in the two electrode sensor configuration.

Figure 9:
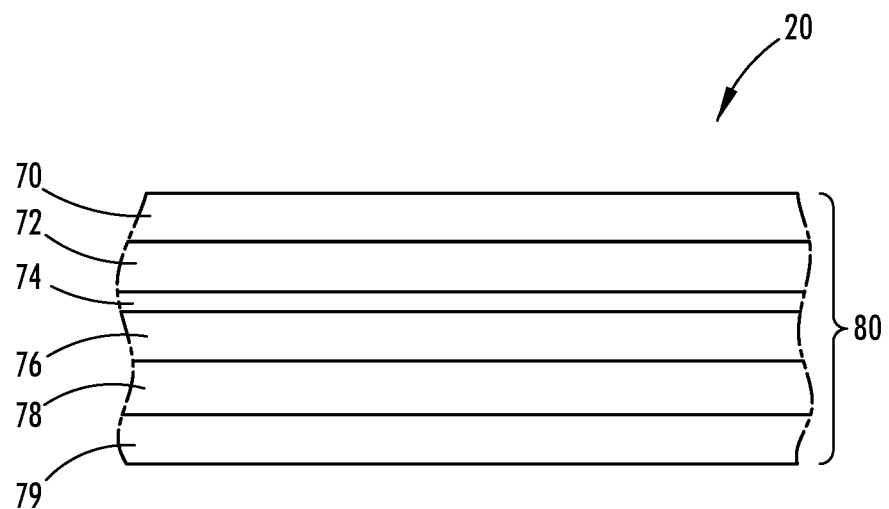
FIG. 9 is a cross-sectional view taken through line IX-IX of FIG. 3 illustrating layers of the vehicle keypad user input device.

Referring to FIG. 9, the vehicle keypad user input device 20 is further illustrated taken from a cross section in FIG. 3 according to one embodiment. The cross section illustrates how a display 80 may be formed by a plurality of layers. The display 80 may be formed by a plurality of stacked layers. In an exemplary embodiment, the layers may comprise a backing shell 70, which may be formed of a heat conductive material. For example, in some embodiments, the backing shell 70 may be formed of a thermally conductive plastic or polymeric material, which may be conductively connected to a vehicle structure such as a support pillar. In this configuration, excess heat that may be generated by a backlight layer 72 may be conducted outward through the backing shell 70 and into a material forming the support structure (e.g., a metallic material forming the frame of the vehicle 10). In this way, the display 80 may be configured to conduct heat outward into one or more panels of the vehicle 10 to dissipate any unnecessary and/or potentially damaging heat.

The backlight layer 72 may be adjacent to and/or in contact with the backing shell 70. The backlight layer 72 may comprise a plurality of LEDs or other highly efficient light sources distributed over the display surface of each of the display. The light sources of the backlight layer 72 may be configured to directly emit a generated light outward from the backlight layer 72 in a direct lighting configuration. In this way, the display 80 may maximize a brightness of the visual information displayed on the display such that the display 80 may function in a wide range of ambient lighting conditions (e.g., dark ambient lighting conditions to direct sunlight conditions).

In operation, the controller of the display 80 may control the backlight layer 72 to direct the generated emission of the light outward into a liquid crystal display (LCD) layer 74. The display 74 may selectively transmit the light generated by the backlight layer 72 through the liquid crystal display layer 74 outward into one or more of a heater layer 76, a touch sensor layer 78, and/or a protective layer 79. In this configuration, the display 80 may provide a robust display touchscreen, which may be controlled to not only display the visual information such as keypad icons, but also, provide for the user interface via capacitive sensors in the touch sensor layer 78 and various additional beneficial features as discussed herein.

The heater layer 76 may be implemented as a thin film comprising a plurality of heater strips which may be formed by indium tin oxide (ITO), a conductive film or ink (PDOT), and or various other suitable materials. The touch sensor layer 78 may be implemented by the capacitive sensors or various other forms of proximity sensors and may form a matrix of detection regions distributed over the display surface of the display 80. Finally, the protective layer 79 may correspond to a scratch and/or impact resistant glass or similar transparent material (e.g. Gorilla® glass, Willow® glass, etc.) and may comprise one or more coatings configured to prevent dust and/or contaminant buildup (e.g., a titanium dioxide coating). Accordingly, as discussed herein, the display may provide for a highly effective visual display 80 that may be operable to provide various user interface functions and communicate visual information from the exterior of the vehicle 10.

Figure 10:
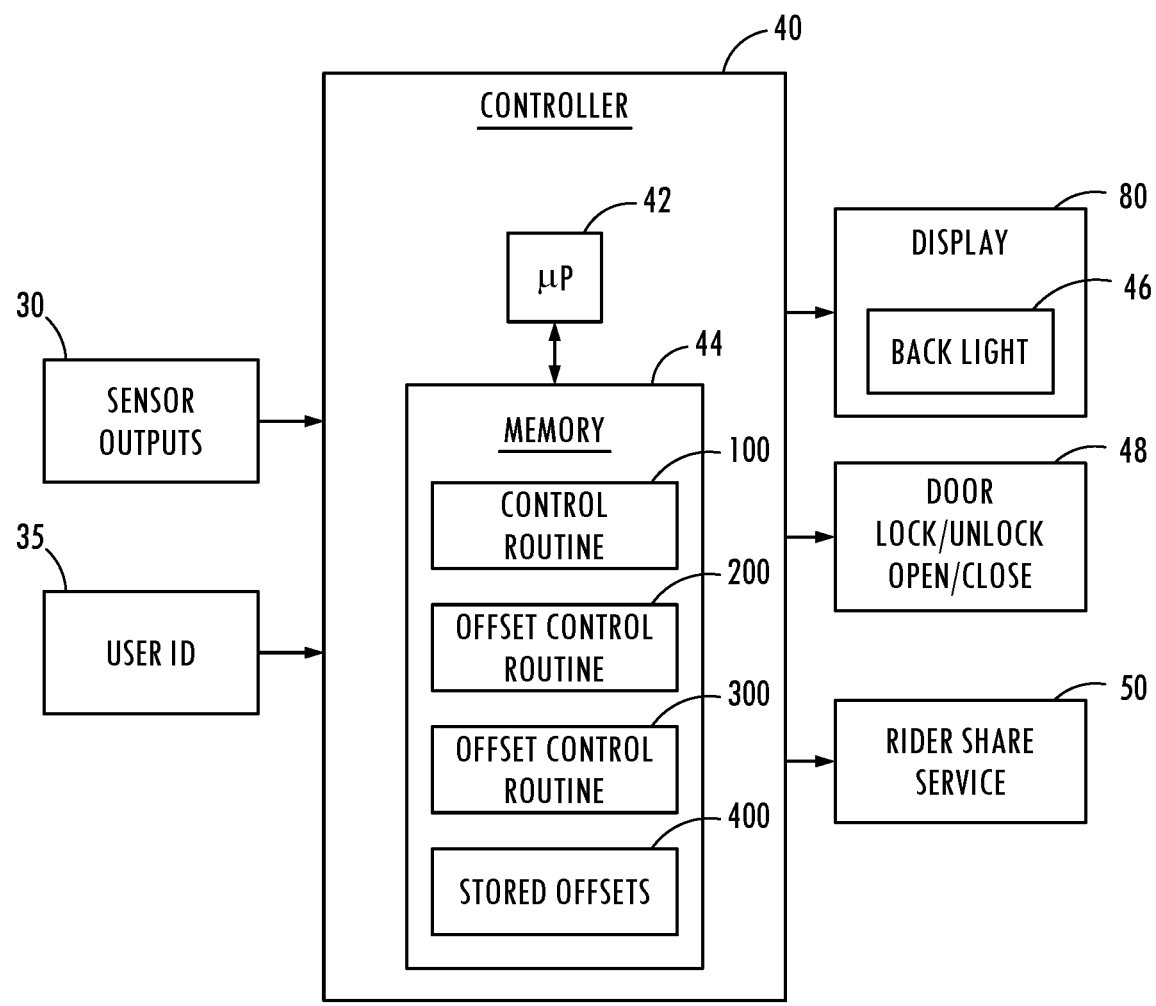
FIG. 10 is a block diagram further illustrating the vehicle keypad user input device, according to one embodiment.

Referring to FIG. 10, the vehicle keypad user input device 20 is further illustrated having a controller 40 which may include a microprocessor 42 and memory 44. It should be appreciated that the controller 40 may include other analog and/or digital control circuitry. The controller 40 receives the sensor outputs from the proximity sensors and generates output signals to control various functions. For example, the output signals may control a back light 46 for the display 80 and may control the liquid crystal display 52 and other aspects of the display 80. Additionally, the controller 40 may control the door lock/unlock/open/close mechanism 48 on the vehicle. Further, controller 40 may provide information to one or more ride share services 50. For example, a ride share service 50 may allow for the display 80 to display other information for ride share users and to allow for other inputs to be entered on the touchscreen. The controller 40 may execute a control routine 100 stored in memory 44 via the microprocessor 42 to control the various functions. In addition, the controller 40 may execute an offset control routine 200, according to a first embodiment, or an offset control routine 300, according to a second embodiment. One or both of the offset control routines 200 and 300 is stored in memory and executed by the microprocessor 42 of controller 40. Additionally, stored offset values that are unique to a user may be stored in memory 44 and used to select the offset that is used to adjust the sensing area for one or more virtual button icons for a given user.

Figure 11:
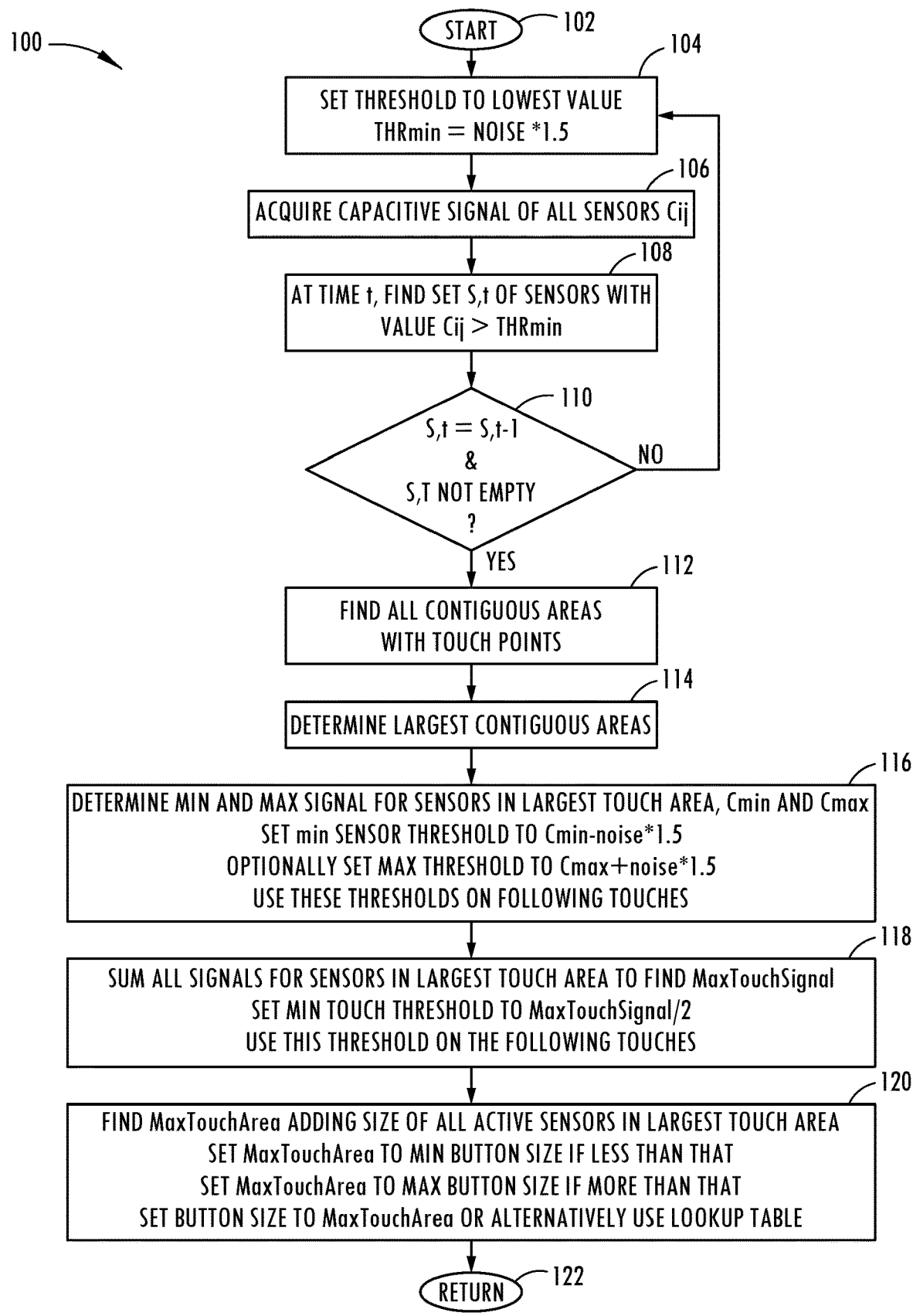
FIG. 11 is a flow diagram illustrating a routine for controlling the variable size of the vehicle keypad user input device, according to one embodiment.

Referring to FIG. 11, the control routine 100 for controlling the variable size and separation distance of the virtual icons is illustrated, according to one embodiment. Routine 100 begins at step 102 and proceeds to step 104 to set the threshold to the lowest value which is shown as $THR_{min}$ equal to a noise parameter (NOISE) multiplied by a factor of 1.5. Next, routine 100 proceeds to step 106 to acquire the capacitive signal of all capacitive sensors. At step 108, routine 100 at a given time t finds a set S, t of capacitive sensors with a value $C_{ij}$ greater than the minimum threshold $THR_{min}$. Thereafter, routine 100 proceeds to decision step 110 to determine if the set S, t of sensor values for the current value is equal to the prior value and is not empty and, if not, returns to step 104. Otherwise, routine 100 proceeds to step 112 to find all contiguous areas of the touchscreen display with touchpoints and then to step 114 to determine the largest contiguous area. Next, at step 116, routine 100 determines the min and max signal for sensors in the largest touch area, identified as $C_{min}$ and $C_{max}$; sets the min sensor threshold to a value minus noise multiplied by 1.5; optionally sets a max threshold to $C_{max}$ plus noise multiplied by 1.5; and uses these thresholds on subsequent user input touches. At step 118, routine 100 sums all signals for capacitive sensors in the largest touch area to find a max touch signal; sets a min touch threshold to max touch signal divided by 2; and uses this threshold for subsequent user input touches. Finally, at step 120, routine 100 finds a max touch area adding size of all active sensors in the largest touch area; sets the max touch area to min button size if less than that; sets the max touch area to max button size if more than that; and sets the button size to max touch area or alternatively uses a lookup table 120 before returning at step 122.

Accordingly, the vehicle input device 20 advantageously employs a touchscreen display 80 and virtual button icons 26 to provide a keypad on a vehicle. The vehicle input device 20 advantageously adjusts the size of the virtual button icons 26 which may allow for enhanced or reduced sensitivity due to the greater or lesser number of proximity sensors 30 employed for each virtual button icon 26. Additionally, the separation distance between the virtual button icons 26 may be increased or decreased. As such, a variable size of the display device may be achieved.

Figure 12:
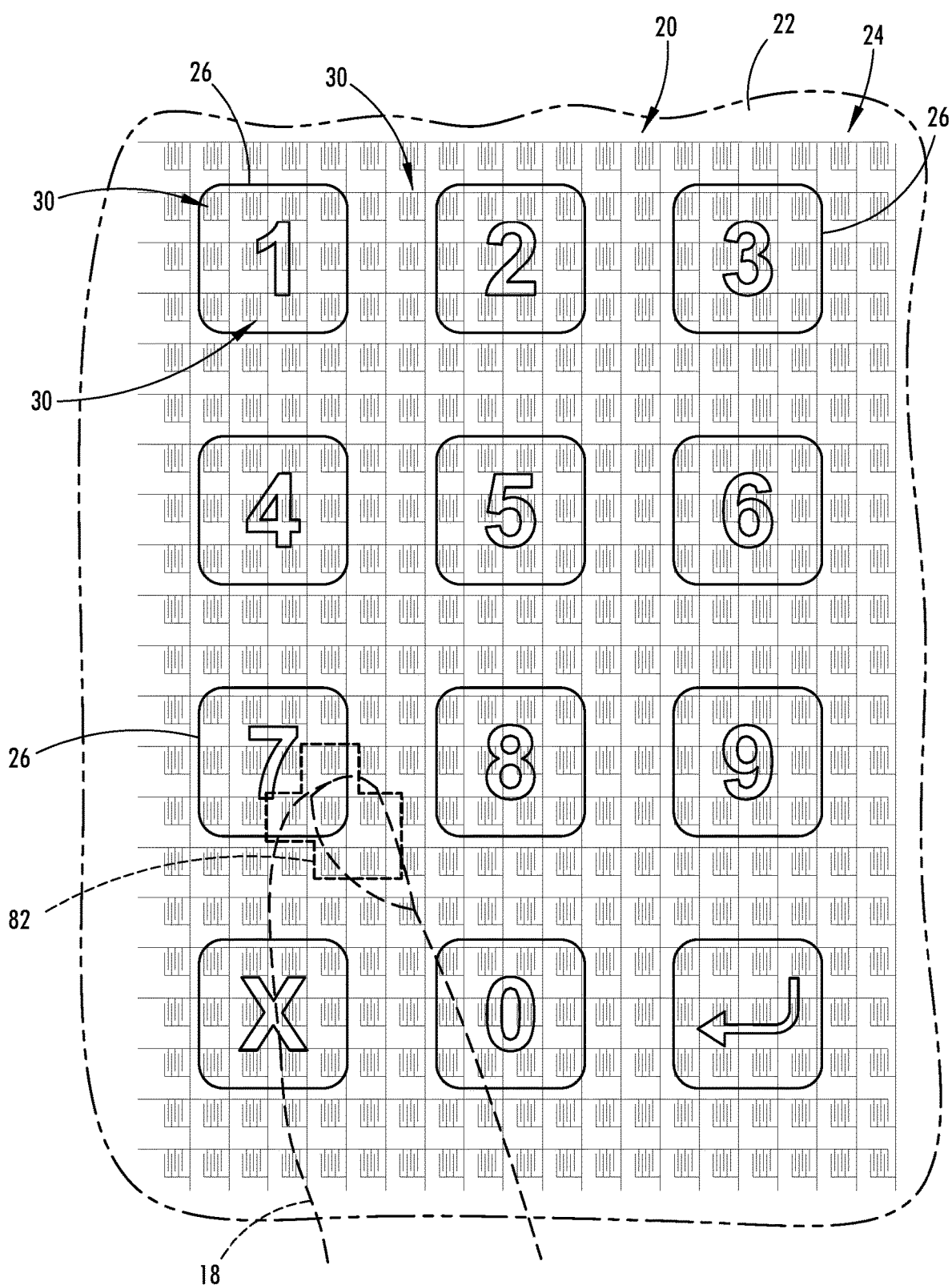
FIG. 12 is a schematic diagram illustrating a vehicle keypad user input device showing an activation area for generating an offset, according to a first embodiment.
Figure 13:
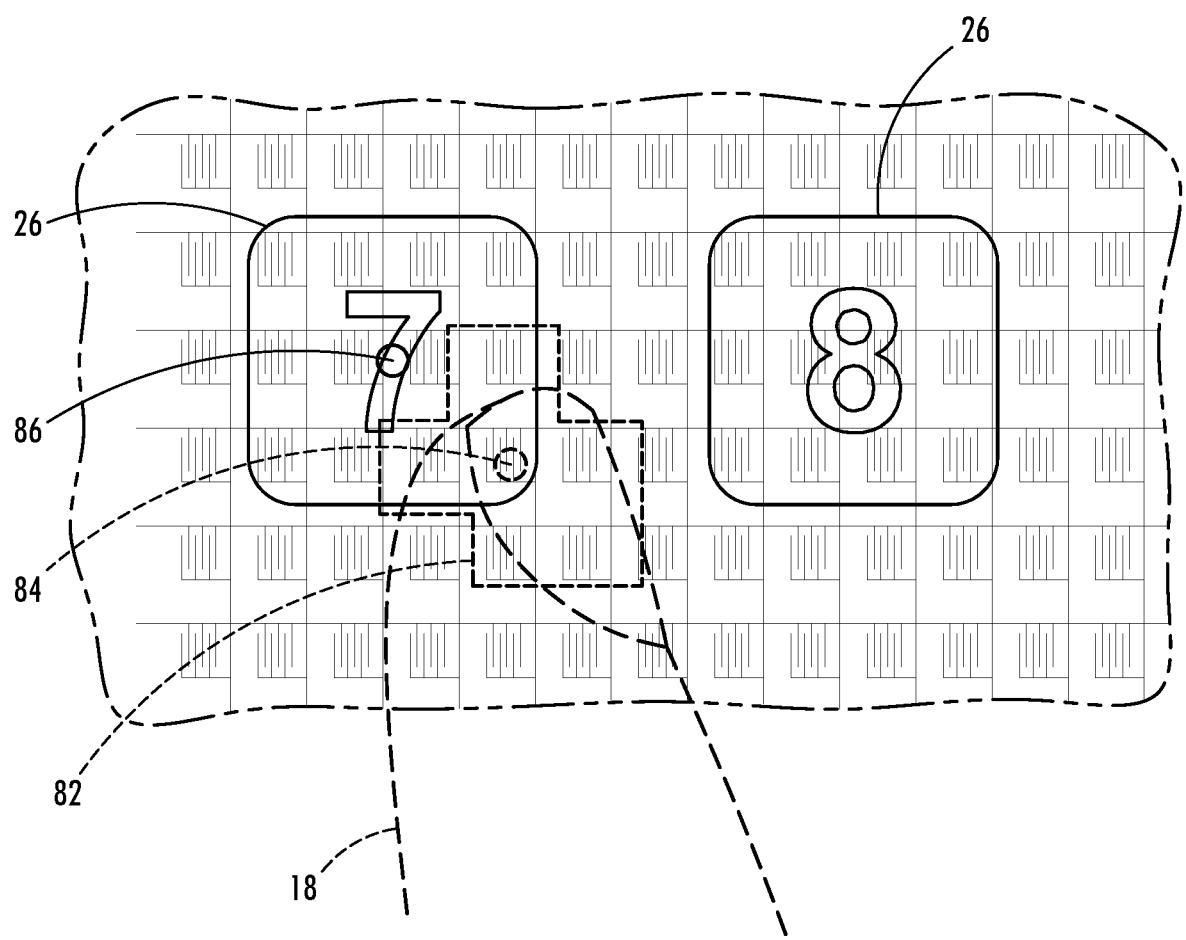
FIG. 13 is an enlarged schematic diagram illustrating a portion of the vehicle keypad user input device of FIG. 12 further illustrating the activation area of a keypad.

Referring to FIGS. 12 and 13, the vehicle keypad user input device 20 is shown displaying a plurality of virtual button icons 26 positioned overlaying the matrix of proximity sensors 30 as described above. In addition, a finger of a user 18 is shown interfacing with one of the virtual button icons 26, shown labeled as input button number 7. In this use scenario, the finger of the user 18 is misaligned with the center of the selected virtual button icon 26 such that the proximity sensors 30 sense an activation area 82 that is offset from the center of the virtual button icon 26. In this example shown, the activation area 82 is shown having six capacitive sensors sensing a sufficient signal greater than a predefined threshold indicative of a finger interacting with the activation area 82. The activation area 82 is off center relative to the selected virtual button icon 86 such that the activation area 82 is shown having an activation area center 84 located near a lower right-hand corner of the selected virtual button icon 26. The activation area center 84 is offset from a center 86 of the selected virtual button icon 26.

The misalignment of the activation area 82 with the virtual button icon 86 may be the result of the shape of the user's finger and the posture adopted by the user while executing the touch input. Additionally, when a user wears a glove on the interfacing hand or approaches the vehicle or the vehicle keypad user input device 20 from different angles and with different hands or fingers, the location of the sensed activation area 82 may vary. This may be particularly true for different users such that the offset for each user may vary. Further, the properties of the user's finger such as the dielectric and conductive properties and length and size of the finger and size of fingernails may impact the center 84 of the activation area 82.

When the user's finger initially interacts with the vehicle keypad user input device 20, the device 20 monitors each of the proximity sensors 30 and determines whether a valid input having enough sensed activation signal is detected. This includes identifying contiguous areas of interaction or touch on the touch screen 22 and establishing with the activation area an active neighbor cluster which can be identified as the activation area 82. Thus, the activation area 82 may be made up of a plurality of areas on the touchscreen sensed by proximity sensors arranged in a cluster. Additionally, the overall interaction or touch intensity may be calculated for the entire interface. If the overall touch intensity is indicative of a valid input, the activation center 84 can be calculated as an average of all sensor areas in the sensor cluster. This may include using a weighted intensity. The location of the activation area center 84 is then compared to the center 86 of the different virtual button icons 26 on the keypad input device 20 and a selected button icon 26 is identified if the activation area center 84 is contained within the boundary of a given virtual button icon 26.

According to one embodiment, there is no offset is stored or associated the keypad initially. A first offset may be calculated after the first intended user touch event; however, the initial user touch event that activates the vehicle keypad user input device 20 preferably does not count as the initial user touch event according to one embodiment. In the absence of a stored offset, the offset that is determined while entering inputs may be used for all subsequent touches while entering inputs on the input device 20. For example, as a vehicle door unlock combination code is entered, the offset for each button touch may be used to create and store a new offset profile in memory. According to one embodiment, the offset established with the first button entry is used for all successive keypad inputs on the other virtual button icons. As a user continues to activate sequential virtual button icons, the offset may be adjusted based on the successive offsets and may employ an average offset accumulated during the user interaction. Further, it should be appreciated that a weighted value may be applied to adjust the offset based on a percentage such that a partial offset registration is thereby implemented.

Figure 14:
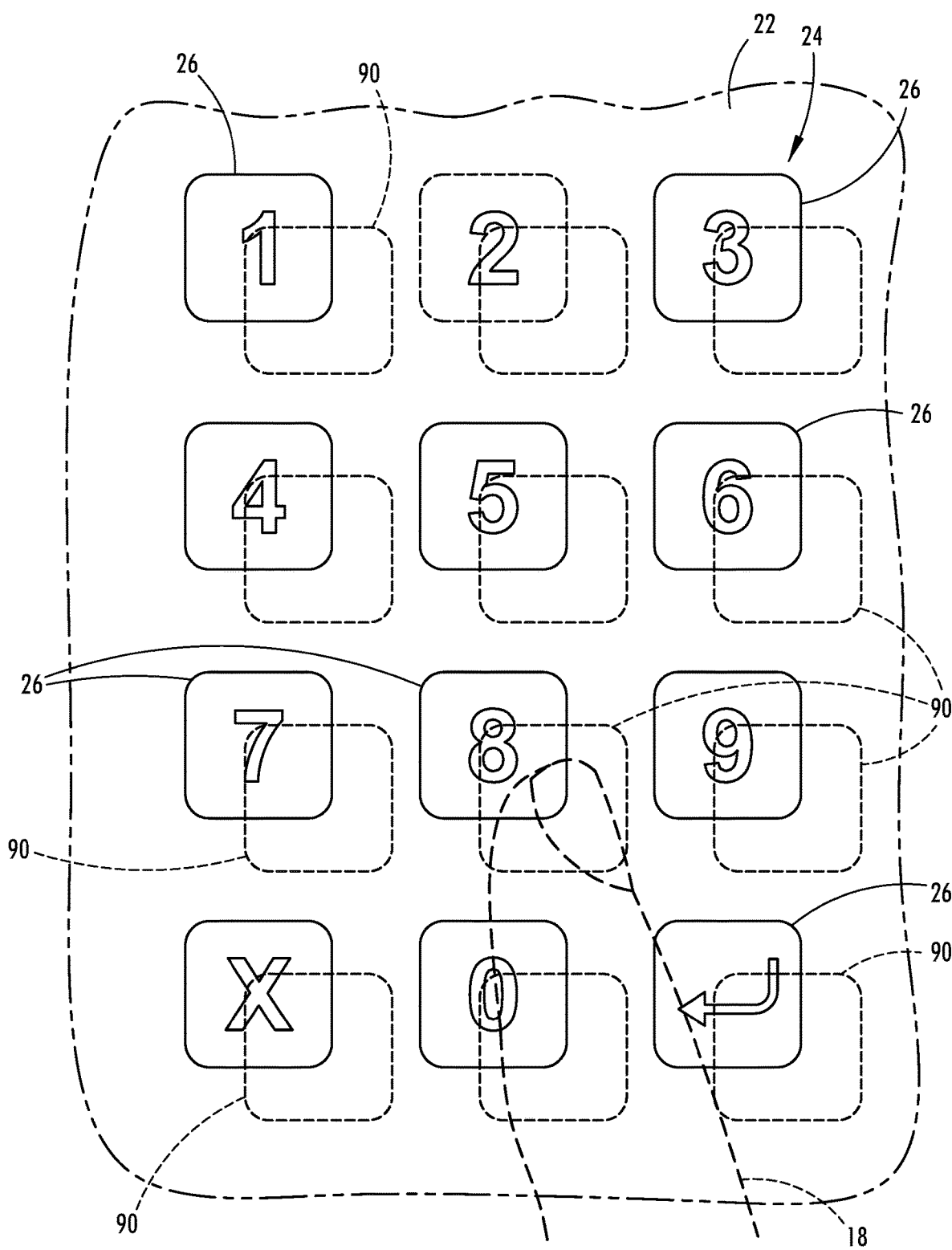
FIG. 14 is a schematic diagram illustrating the vehicle keypad user input device of FIG. 12 further illustrating the offset sensing area for each of the virtual button icons.
Figure 15:
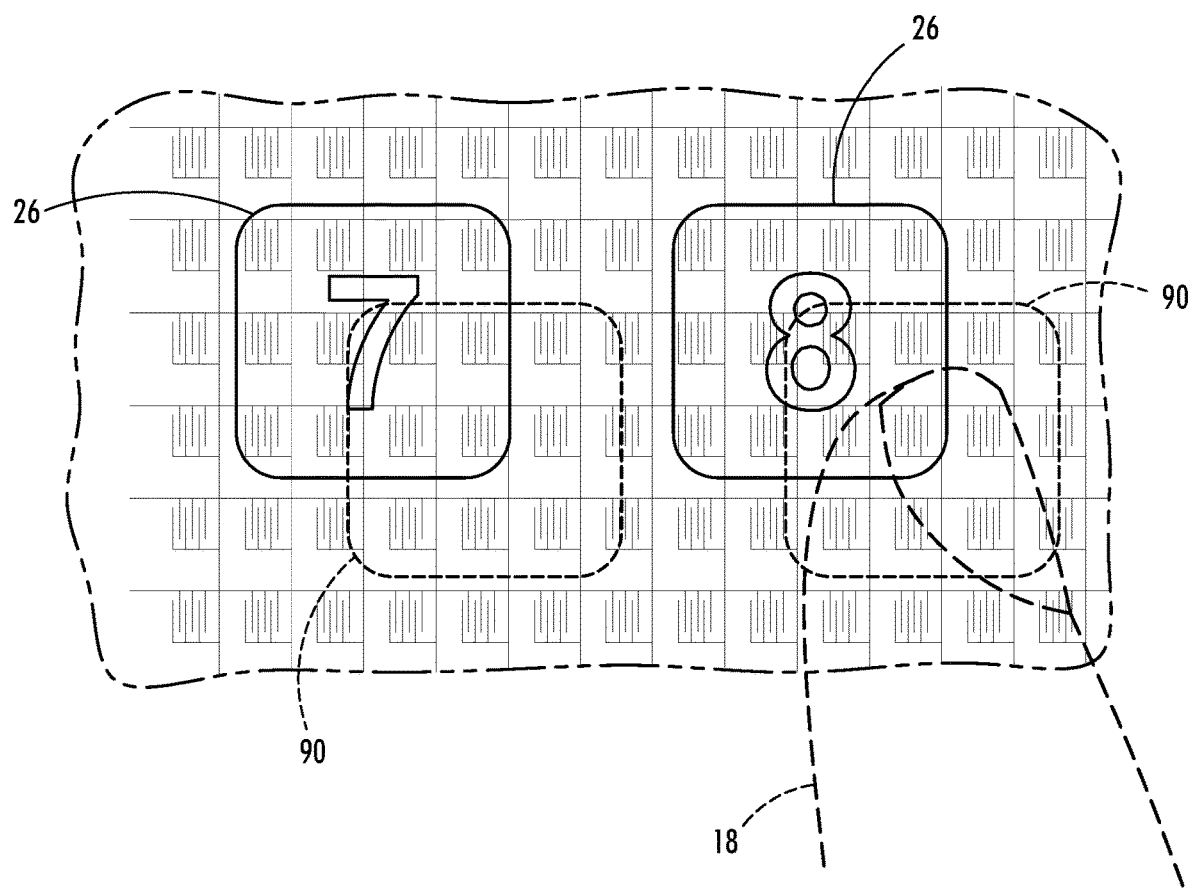
FIG. 15 is an enlarged schematic diagram illustrating a portion of the vehicle keypad user input device of FIG. 12 further illustrating the offset sensing area.

Referring to FIGS. 14 and 15, the offset sensing area 90 for each of the virtual button icons 26 is illustrated for the example shown in FIGS. 12 and 13. Once the offset established by the user interacting with one of the virtual button icons 26 is established, the offset is applied to all of the keypad virtual button icons 26. As such, as the user depresses the next keypad shown labeled as number 8, the offset sensing area 90 for the corresponding virtual button icon 26 is shifted based on the determined offset such that an interaction with the new sensing area 90 senses an interaction for the virtual button icon assigned thereto. Each time a user interacts with another virtual button icon 26, the new sensing area 90 may be modified based on the offset distance between the center 86 of the virtual button icon 26 and the center 84 of the detected activation area 82. The offset sensing area 90 may be a running average that is recomputed with each successive touch activation.

In one embodiment, the offset is detected and the sensing area 90 is adjusted based on the offset at the start of each use activity for entering inputs into the vehicle keypad user input device 20. According to other embodiments, one or more offsets and offset sensing areas 90 may be stored in memory and used for subsequent interactions with the vehicle keypad user input device 20. The stored offsets and sensing areas 90 may be unique to a given user and may be associated with unique virtual button icons 26.

Figure 16:
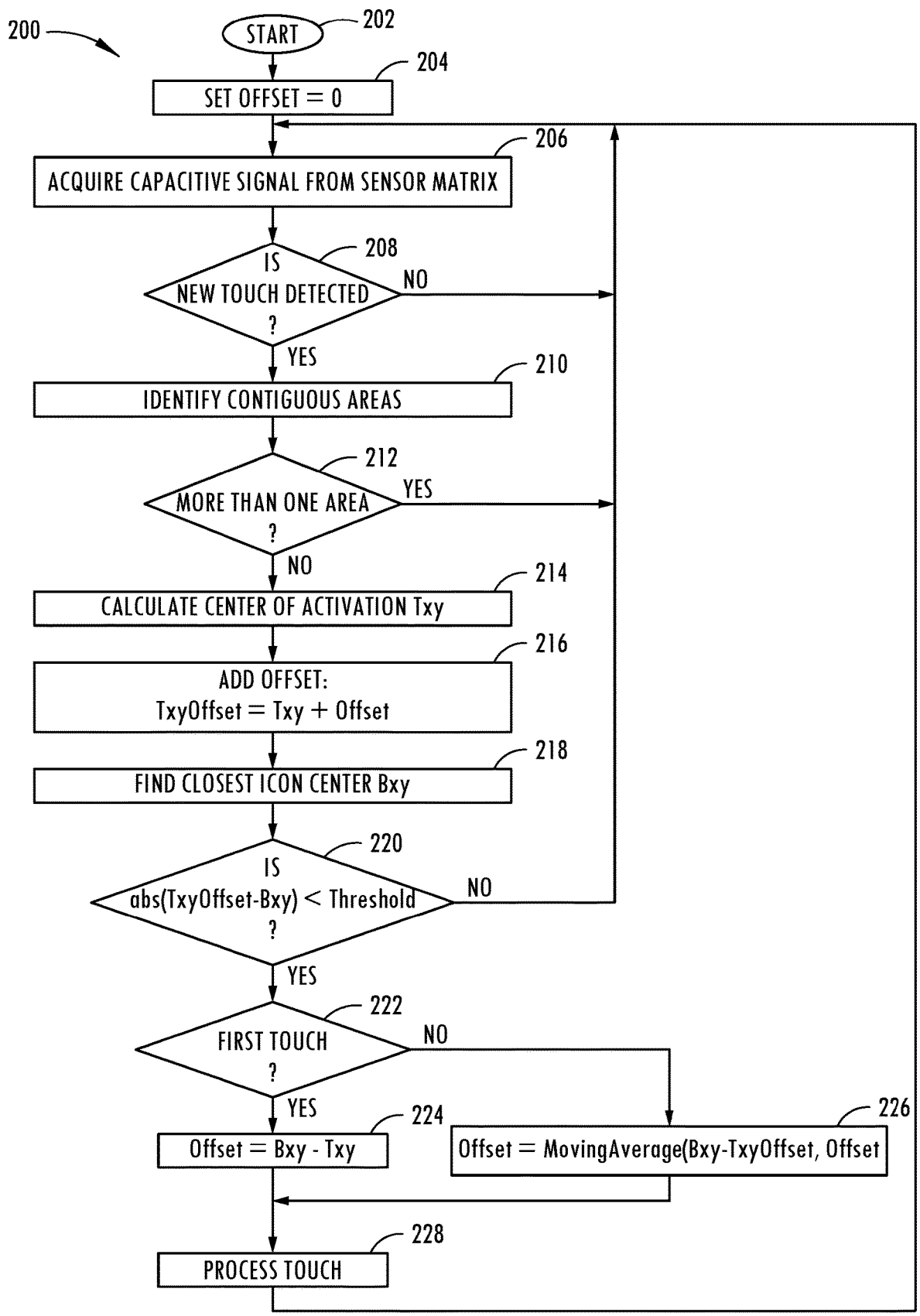
FIG. 16 is a flow diagram illustrating a routine for detecting and generating the offset for the keypad, according to the first embodiment.

Referring to FIG. 16, a routine for registering the offset and applying the offset to adjust the sensing areas is shown according to a first embodiment. In the first embodiment, the offset and the offset sensing area are established for each new activity of the vehicle keypad user input device 20. Routine 200 begins at step 202 and proceeds to step 204 to set the offset equal to zero, and then proceeds to step 206 to acquire the capacitive signal for each capacitive sensor from the sensor matrix. Next, at decision step 208, routine 200 determines if a new user touch event has been detected and, if not, returns to step 206. A user touch event may be a direct touch on the touchscreen or close proximity such as within a few millimeters of the touchscreen sufficient to generate a large enough signal with one or more capacitive sensors. If a new touch event is detected, routine 200 proceeds to step 210 to identify the contiguous activation area(s) of the touch event. In decision step 212, routine 200 determines if more than one activation area has been touched and, if so, returns to step 206. If a single contiguous area has been touched, routine 200 proceeds to step 214 to calculate the center of the activation area Txy, and then to step 216 to add the offset to the center of the activation Txy to set Txy offset. Next, at step 218, routine 200 finds the closest virtual button icon center Bxy. Proceeding to decision step 220, routine 200 determines if the absolute value of the difference between Txy offset and the icon center Bxy is less than a threshold and, if not, returns to step 206. If the absolute value is less than the threshold, routine 200 proceeds to decision step 222 to determine if this is a first touch event and, if so, sets the offset as the difference between the closest icon center Bxy and the center of activation Txy at step 224, and then processes the touch input command at step 228, before returning to step 206. If the interaction is not the first touch, routine 200 proceeds to step 226 to set the offset as a moving average of the difference between the closest icon center Bxy and the offset, before proceeding to step 228 to process the touch input command and thereafter returns to step 206. Accordingly, routine 200 sets the offset following the first touch and thereafter establishes a moving average for all subsequent touches of the virtual button icons during a user interaction with the vehicle keypad user input device 20.

Figure 17:
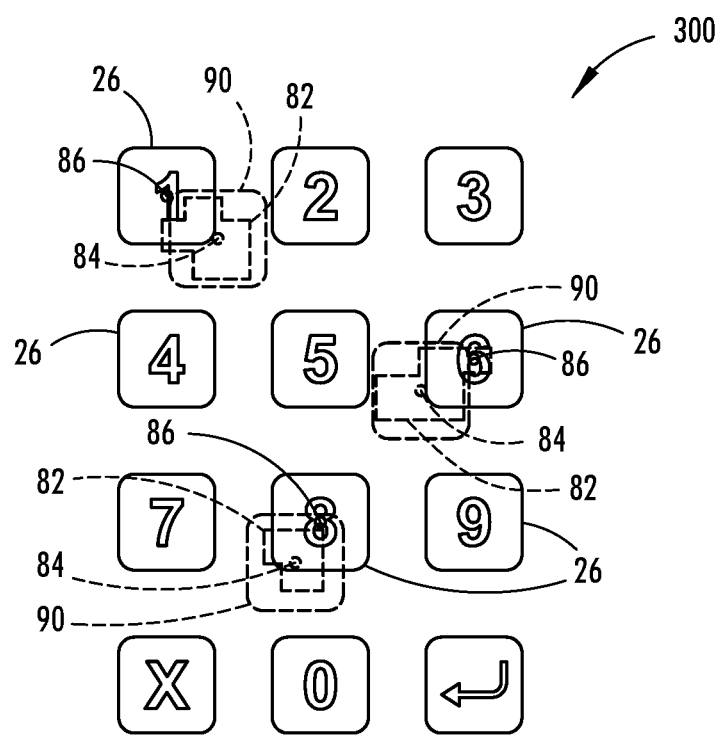
FIG. 17 is an enlarged schematic diagram illustrating a vehicle keypad user input device showing an activation area for generating an offset, according to a second embodiment.

Referring to FIG. 17, offset profiles for a sequence of inputs into the vehicle keypad user input device 20 are illustrated according to a second embodiment. In this embodiment, the user is identified and user specific profiles are stored in memory and used for subsequent activations of the vehicle keypad user input device 20. For example, as shown with respect to the virtual button icon 26 identified by the button labeled numeral "1," an activation area 82 having a center 84 is shown offset from the center 86 of the virtual button icon 26 and the difference between the centers 84 and 86 is established as the offset for setting the new offset sensing area 90. The offset sensing area 90 is specific to a user interacting with that specific virtual button icon and is stored in memory and used for subsequent activations of the vehicle keypad user input device 20.

For this same example, the virtual button icon labeled as numeral "6" likewise has an activation area 82 with a center 84 offset from center 86 of icon 26 which is used to establish a new offset sensing area 90 for that virtual button icon 26. Further, virtual button icon 26 labeled numeral "8" similarly has an activation area 82 of the center 84 offset from center 86 of the virtual button icon 26 that is used to establish the new offset sensed area of that icon button 26. The pattern for new offset sensing areas 90 may be saved in memory for each user such that each time the user is identified interfacing with the vehicle keypad user input device 20, the saved profiles for offsets for that particular user are employed. It should be appreciated that the saved profile offsets for each user may include an average that is accumulated and updated over time during subsequent use of the vehicle keypad user input device 20.

The user of the vehicle keypad user input device 20 may be identified by using one or more user recognition techniques such as face recognition by processing images of the face of the user acquired by a camera, or fingerprint recognition on the touchscreen or the presence of a unique portable electronic device such as a phone or key fob that is unique to a particular user.

Figure 18A:
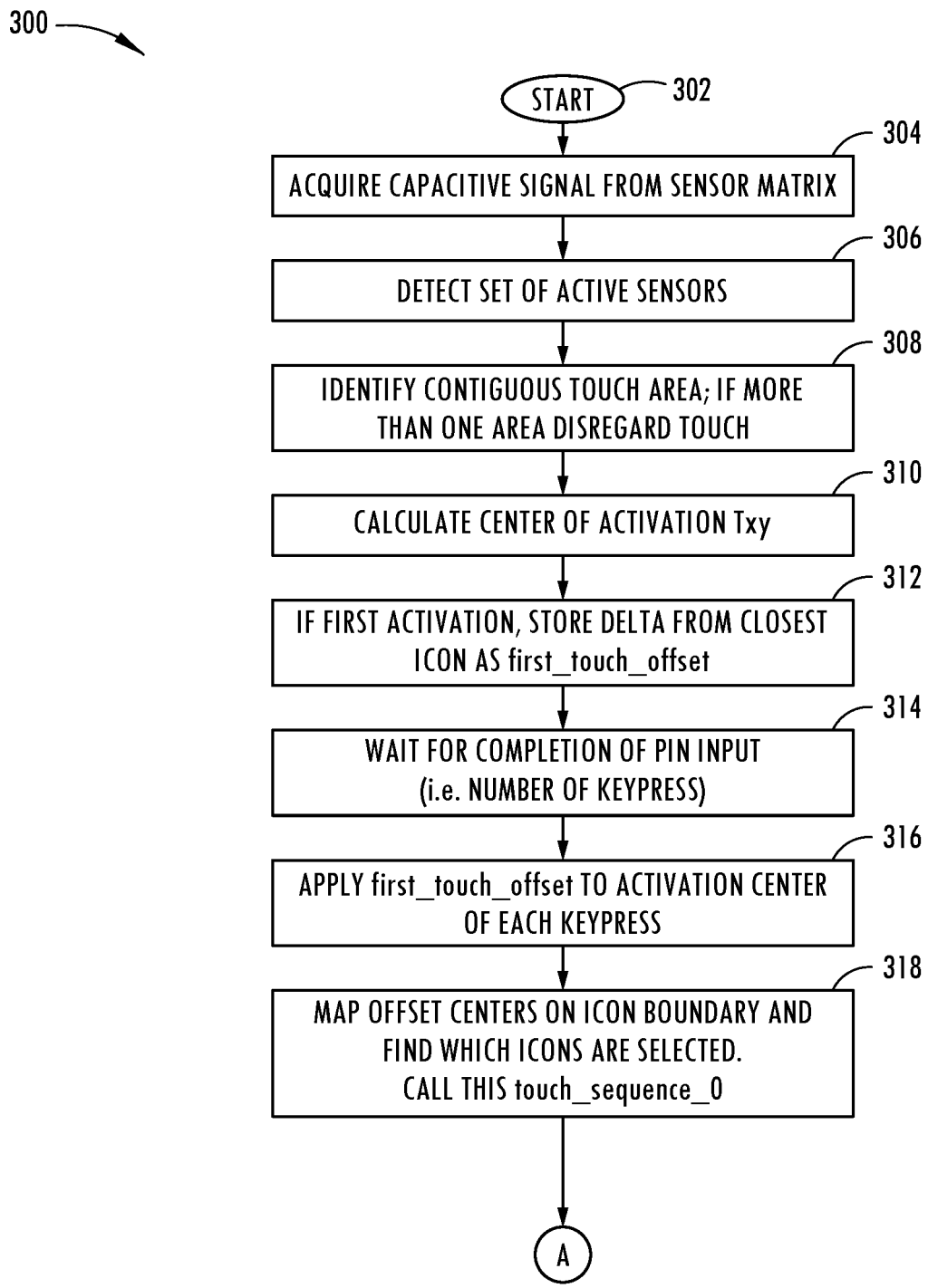
FIGS. 18A-18B is a flow diagram illustrating a routine for detecting and generating the offset for the keypad, according to the second embodiment.
Figure 18B:
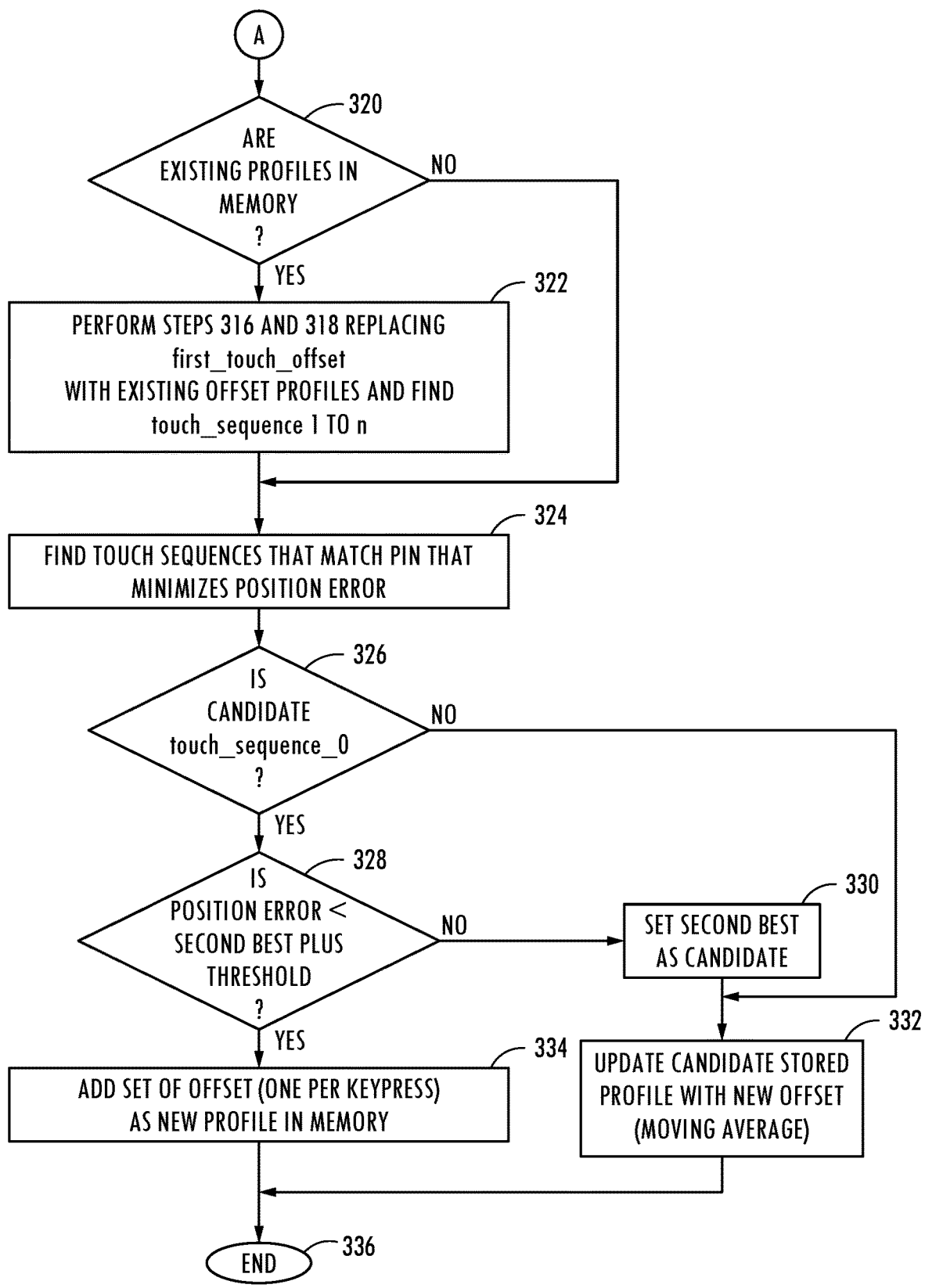

Referring to FIGS. 18A and 18B, the routine 300 for controlling the offset of the vehicle keypad user input device 20, according to the second embodiment is illustrated. Routine 300 begins at step 302 and proceeds to step 304 to acquire the capacitive signal from the sensor matrix and then to step 306 to detect a set of active sensors. Next, routine 300 proceeds to step 308 to identify a contiguous touch event area and, if more than one area is detected, disregards the touch event. Next, at step 310, routine 300 calculates the center of the activation area Txy and at step 302 if it is determined as the first activation, stores the distance from the closest icon as the first touch offset. Thereafter, routine 300 waits for completion of the input entries, such as the successive keypad touch events. Next, at step 316, routine 300 applies a first touch offset to the activation center of each key press touch event and at step 318 maps the offset centers of the virtual button icon boundary and finds which virtual button icons are selected. Proceeding to decision step 320, routine 300 determines if all existing profiles are in memory and, if not, skips to step 324. If all existing profiles are in memory, routine 300 performs steps 316 and 318 and replaces the first touch offset with the existing offset profiles and finds a touch event sequence for each input from 1 to n. At step 324, routine 300 finds the touch event sequences that match the input sequence pin that minimizes position error. Next, at decision step 326, routine 300 determines if the candidate is a touch event sequence and, if so, proceeds to decision step 328 to determine if the position error is less than a second best within a range defined by a threshold and, if so, adds the set of offset (one per key press) as the new profile in memory before ending at step 336. If the position error is not less than the second best plus the threshold, routine 300 proceeds to set the second best as the candidate at step 330 before proceeding to step 332. Following step 330 or if the candidate touch sequence is not 0, routine 300 proceeds to step 332 to update the candidate stored profile with the new offset or with a moving average before ending at step 336.

Accordingly, the vehicle input device advantageously employs a touch screen display 80 and virtual button icons 26 and applies an offset to correct for misalignment of a user's finger with the keypads. The vehicle input device 20 advantageously adjusts for the offset by applying an offset sensing area to allow for enhanced operation of the input device 20. As such, the device 20 may be efficiently and effectively operated without regard to misalignment between the user's finger and the virtual button icons.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle input device comprising:
   a touchscreen having an array of proximity sensors located on a vehicle; a display displaying virtual input icons;
   wherein each virtual input icon is displayed on an area of the display over a plurality of proximity sensors for sensing user interaction with the virtual input icon; and
   a controller determining a location of a user input from the proximity sensors, determining an offset of the input from one of the virtual input icons and adjusting a sensing area of the proximity sensors for the icon based on the offset.

2. The input device of claim 1, wherein the virtual input icons define keypad inputs for a keypad device.

3. The input device of claim 2, wherein the device is located on an exterior of the vehicle to control vehicle access based on user input of the keypad device.

4. The input device of claim 1, wherein the device is located on a vehicle pillar.

5. The input device of claim 1, wherein signals sensed with the plurality of proximity sensors are summed to provide a total signal value that is used to activate a keypad.

6. The input device of claim 1, wherein the controller adjusts an offset for each of the virtual input icons based on the offset.

7. The input device of claim 1, wherein the proximity sensors comprise capacitive sensors.

8. The input device of claim 7, wherein the capacitive sensors are configured in an array.

9. The input device of claim 1, wherein the controller stores the offset in memory for a unique user and adjusts the sensor area based on the stored offset for future use by the user.

10. The input device of claim 9, wherein the unique user is identified based on a user identification sensor.

11. A vehicle keypad device comprising:
    a touchscreen having an array of proximity sensors located on an exterior of a vehicle; a keypad display displaying virtual input button icons proximate the proximity sensors;
    wherein each virtual input icon is displayed on an area of the display over a plurality of proximity sensors for sensing user interaction with the virtual input icon;
    and a controller determining a location of a user input from the proximity sensors, determining an offset of the input from one of the virtual input icons and adjusting a sensing area of the proximity sensors for the icon based on the offset.

12. The keypad device of claim 11, wherein the device is configured to control vehicle access based on user input of the keypad device.

13. The keypad device of claim 11, wherein each virtual input button icon is displayed on an area of the display over a plurality of proximity sensors for sensing user interaction with the virtual button icon.

14. The keypad device of claim 11, wherein the proximity sensors comprise capacitive sensors, wherein the capacitive sensors are configured in an array.

15. The keypad device of claim 11, wherein each virtual input icon is displayed on an area of the display over a plurality of proximity sensors for sensing user interaction with the icon.

16. The keypad device of claim 11, wherein the controller stores the offset in memory for a unique user and adjusts the sensor area based on the stored offset for future use by the user, wherein the unique user is identified based on user identification.

17. A method of generating a user input, comprising:
providing a touch screen having an array of proximity sensors located on a vehicle; displaying virtual input button icons on the touch screen proximate to the proximity sensors wherein each virtual input icon is displayed on an area of the display over a plurality of proximity sensors for sensing user interaction with the virtual input button icon;
sensing a user interacting with the proximity sensors; determining an offset distance between the sensed user interaction and one of the virtual input button icon;
and adjusting a sensing area of one or more of the virtual button icons based on the determined offset.

18. The method of claim 17, wherein the virtual input icons define keypad inputs for a keypad device, wherein the device is located on an exterior of the vehicle to control vehicle access based on user input of the keypad device.

19. The method of claim 17, wherein the controller stores the offset in memory for a unique user and adjusts the sensing area based on the stored offset for future use by the user.

* * * * *